G. W. N. Yost,
Mower.

No 85628.  Patented Jan.

Witnesses

James Densmore
William Wansleban

Inventor

G. W. N. Yost,
by atty Jo. C. Clayton

UNITED STATES PATENT OFFICE.

GEORGE W. N. YOST, OF CORRY, PENNSYLVANIA, ASSIGNOR TO CORRY MACHINE COMPANY, OF SAME PLACE.

IMPROVEMENT IN HARVESTERS.

Specification forming part of Letters Patent No. 85,628, dated January 5, 1869.

*To whom it may concern:*

I, GEORGE W. N. YOST, of Corry, Erie county, Pennsylvania, have invented a new and useful Climax Coupling-Lever—an improvement of my climax gearing for grass and grain cutting machines.

The following description, illustrated by the accompanying drawings, will enable others to make the invention, description and drawings having corresponding specifying characters.

Figure 1:
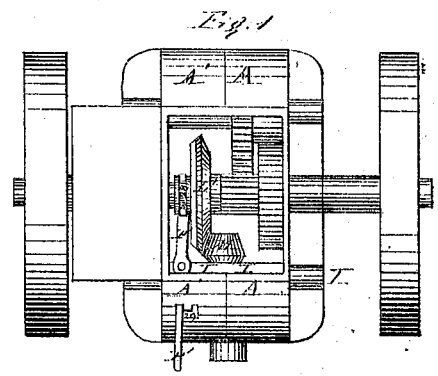
Figure 2:
Figure 3:
Figure 4:
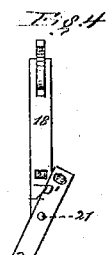

Figure 1 of the drawings is a combined view of my climax body, with my climax gearing therein.

A and A' are two cases, forming the body. L' and M are a bevel-wheel and bevel-pinion of the gearing. I is a fastening-bolt of the cases, and P' is a coupling-lever.

Make a bar, 18, one-fourth of an inch thick, one inch wide, and fourteen inches long, all more or less. On the top of the hind end of the bar 18 pivot a segment, 19, of a collar or ring of a circle three inches in diameter, more or less, the bar of the segment to be half an inch thick, more or less, for the fork of the coupling-lever.

Make a bar, 20, one-fourth of an inch thick, one inch wide, and ten inches long, all more or less. Attach the fore end of the bar 18 to the bar 20 six inches (more or less) forward of the hind end of the bar, by the pivot 21. Through the hind end of the bar 20 make a hole, 22, three-eighths of an inch wide and half an inch long, more or less, the wide way of the hole lengthwise of the bar and the long way of the hole sidewise of the bar. Through the bar 18, in vertical line with the hole 22, make a hole, 23, half an inch (more or less) in diameter.

Make a bolt, 24, half an inch in diameter and an inch long, more or less, with a head, 25, three-fourths of an inch square, more or less, on one end, and a nut, 26, and screw, three-fourths of an inch square, more or less, to go on the other end.

For convenience of keeping the bolt from turning when the nut is screwed on, I make the hole 22 in the bar 18 and a part of the bolt 24 square.

Put the bolt 24 through the holes 23 and 22 in the bars 18 and 20, and screw on the nut 26, and the lever-bar P' is made. Pivot the lever-bar P' thus made to the fastening-bolt I with the segment 19 under and in a groove in the hub 28 of the bevel-wheel L', and with the fore end of the bar in and through the double-lipped mortise or slot 29 in the fore end of the case A', and the invention is finished.

The nature of the invention is in so combining the bars 18 and 20 as to make an adjustable lever, so as to throw the bevel-wheel into gear with the bevel-pinion with any required degree of meshing. The oblong hole in the end of the bar 20 allows the end of the bar to move sidewise, and the nut and screw of the bolt will fasten it in the position required. By thus changing the shape of the lever-bar P', the required degree of meshing can be obtained.

I claim—

The combination of the bar 18, provided with the hole 23, with the bar 20, provided with the oblong hole 22, the pivot 21, the bolt 24, and the screw-nut 26, made and used, as described, for an adjustable coupling-lever for grass and grain cutting machines.

G. W. N. YOST.

Witnesses:
C. W. ARCHBOLD,
FRANK H. W. GREGG.